United States Patent
Dedoes

[11] Patent Number: 6,079,596
[45] Date of Patent: Jun. 27, 2000

[54] METERING AND DISPENSING ASSEMBLY

[75] Inventor: Jerry Dedoes, Commerce Township, Mich.

[73] Assignee: J. Dedoes, Inc., Wixom, Mich.

[21] Appl. No.: 09/179,753

[22] Filed: Oct. 27, 1998

[51] Int. Cl.⁷ .................................................. G01F 11/00
[52] U.S. Cl. .......................... 222/309; 222/334; 222/409
[58] Field of Search .................................. 222/309, 334, 222/361, 409

[56] References Cited

U.S. PATENT DOCUMENTS

| | | | |
|---|---|---|---|
| 3,126,132 | 3/1964 | Lyon et al. | 222/355 |
| 3,758,005 | 9/1973 | Christine et al. | 222/309 |
| 3,830,410 | 8/1974 | Magrath et al. | 222/309 |
| 4,153,187 | 5/1979 | Marrington | 222/440 |
| 4,228,924 | 10/1980 | Gilbert | 222/309 X |
| 4,238,052 | 12/1980 | Trujillo | 222/43 |
| 4,239,133 | 12/1980 | Turnage | 222/476 |
| 4,265,858 | 5/1981 | Crum et al. | 422/129 |
| 4,291,820 | 9/1981 | Marrington | 222/70 |
| 4,394,940 | 7/1983 | Peterson | 222/276 |
| 4,398,577 | 8/1983 | Sauer | 141/135 |
| 4,641,766 | 2/1987 | Vlasich | 222/391 |
| 4,658,993 | 4/1987 | Vlasich | 222/309 |
| 4,690,310 | 9/1987 | Rasmussen | 222/309 |
| 4,773,569 | 9/1988 | Larsson | 222/181 |
| 4,779,770 | 10/1988 | Herold | 222/391 |
| 4,844,301 | 7/1989 | Juillet | 222/509 |
| 4,852,773 | 8/1989 | Standlick et al. | 222/504 |
| 4,972,978 | 11/1990 | DeLuca | 222/341 |
| 5,301,847 | 4/1994 | Fehr et al. | 222/309 |
| 5,375,766 | 12/1994 | Sweeney | 239/133 |
| 5,402,913 | 4/1995 | Graf | 222/63 |
| 5,429,275 | 7/1995 | Katz | 222/108 |
| 5,429,276 | 7/1995 | Esclar et al. | 222/136 |
| 5,823,406 | 10/1998 | Roberts | 222/309 X |

Primary Examiner—Kevin Shaver
Assistant Examiner—David Deal
Attorney, Agent, or Firm—Gifford, Krass, Groh, Sprinkle, Anderson & Citkowski, P.C.

[57] ABSTRACT

The metering assembly for metering and dispensing non-solid material includes a metering cylinder, an air cylinder, and an air actuator. The metering cylinder has a metering body with a bore and an inlet/outlet port which is in communication with the bore. The metering cylinder includes a displacement rod which has a first end positioned in the bore and an opposed second end. The displacement rod has a first position where the first end of the rod is adjacent to the bottom of the bore and a second position where the first end is spaced from the bottom of the bore. The displacement rod moves between the first and second positions with movement from the first position toward the second position defined as movement in a filling direction and movement from the second position toward the first position defined as movement in a dispensing direction. The metering cylinder also includes a seal for sealing the rod to the bore. The air cylinder is supported in a position spaced from the metering cylinder and includes an air cylinder body and an air cylinder rod extending from the air cylinder body toward the metering cylinder. The air cylinder rod has an actuator end connected to the second end of the displacement rod for movement therewith in the filling and dispensing directions. The air cylinder is operable to move the air cylinder rod such that the actuator end moves in the dispensing direction and urges the displacement rod of the metering cylinder in the dispensing direction. The air actuator includes an inlet port for connection to a reservoir of non-solid material being metered and dispensed, an outlet port for connection to a dispenser for dispensing the non-solid material, and a switched port which is connected to the inlet/outlet port in the metering body. The air actuator has a first position wherein the inlet port is connected with the switched port and a second position wherein the outlet port is connected to the switched port.

14 Claims, 3 Drawing Sheets

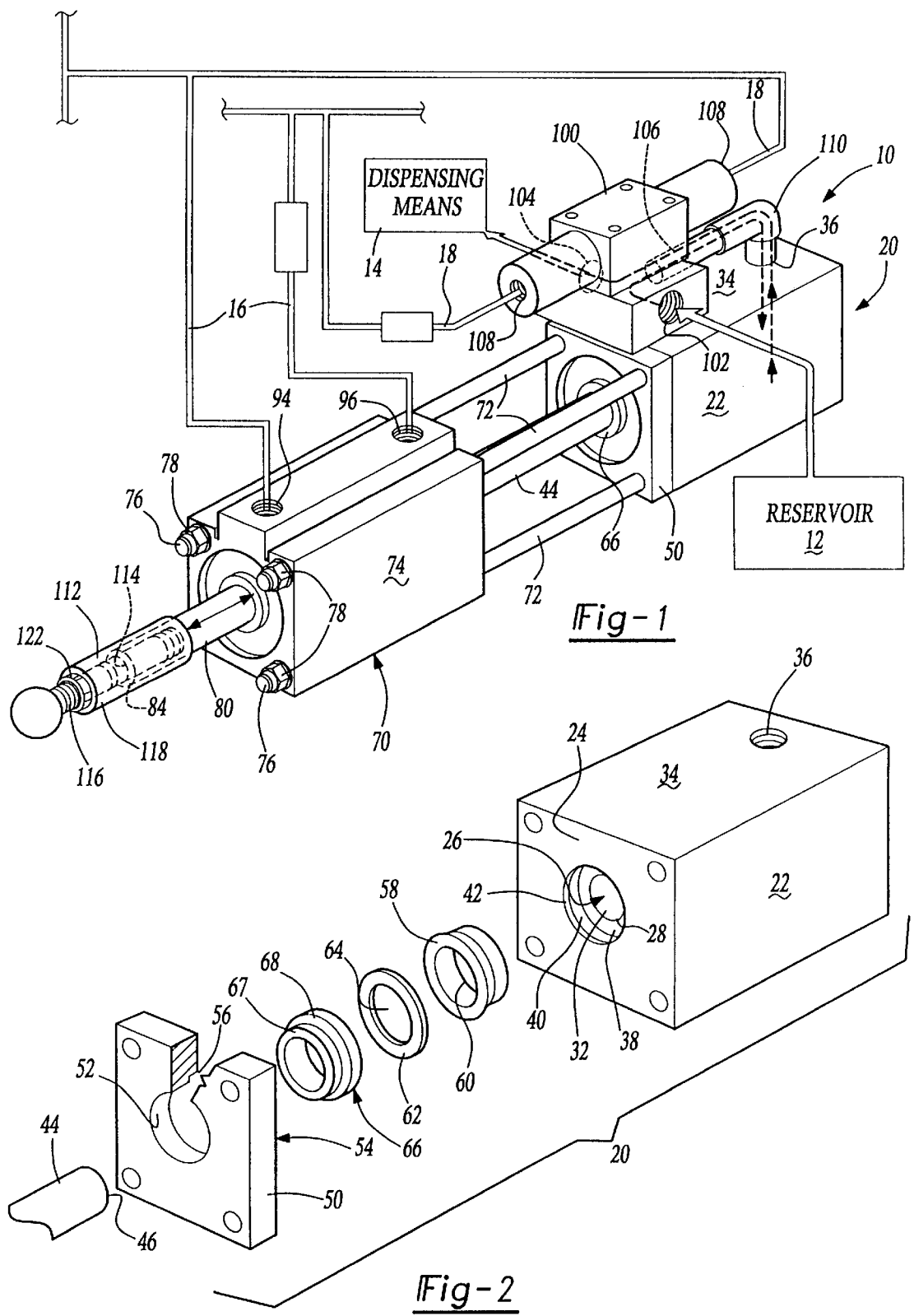

though the process is often difficult. In addition, it is often necessary to dispense the non-solid materials in controlled portions. For
METERING AND DISPENSING ASSEMBLY

FIELD OF THE INVENTION

The present invention relates generally to an apparatus for metering and dispensing non-solid materials such as adhesives, sealants, or greases, and more specifically to an apparatus that includes a bore with a movable dispensing rod positioned in the bore.

BACKGROUND OF THE INVENTION

In many industrial applications, it is necessary to dispense non-solid materials such as adhesives, sealants, and greases. These materials are often highly viscous making their handling especially difficult. In addition, it is often necessary to dispense the non-solid materials in controlled portions. For example, when dispensing an adhesive or sealant, it is necessary that the proper amount of the adhesive or sealant be dispensed for the application at hand. Insufficient or excess adhesive or sealant adversely affects the performance of the material and the use of excess material becomes costly in the long run. If the material being dispensed is one part of a multi-part mixture, the amount of material dispensed is often critical since the performance of the mixture may depend on the ratio of its components. Therefore, there is a need for an apparatus capable of metering and dispensing non-solid material in controlled portions.

In certain applications, the amount of non-solid material required may vary over time or may change if the process is adjusted or fine tuned. Therefore, it is often necessary to adjust the amount of non-solid material being dispensed. Ideally, the metering and dispensing apparatus will allow for easy adjustment of the amount of material to be dispensed.

SUMMARY OF THE INVENTION

Disclosed herein is a metering assembly for metering and dispensing non-solid materials which includes a metering cylinder, an air cylinder, and an air actuator. The metering cylinder has a metering body with a bore and an inlet/outlet port which is in communication with the bore. The metering cylinder includes a displacement rod which has a first end positioned in the bore and an opposed second end. The displacement rod has a first position where the first end of the rod is adjacent to the bottom of the bore and a second position where the first end is spaced from the bottom of the bore. The displacement rod moves between the first and second positions with movement from the first position toward the second position defined as movement in a filling direction and movement from the second position toward the first position defined as movement in a dispensing direction. The metering cylinder also includes a seal for sealing the rod to the bore. The air cylinder is supported in a position spaced from the metering cylinder and includes an air cylinder body and an air cylinder rod extending from the air cylinder body toward the metering cylinder. The air cylinder rod has an actuator end connected to the second end of the displacement rod for movement therewith in the filling and dispensing directions. The air cylinder is operable to move the air cylinder rod such that the actuator end moves in the dispensing direction and urges the displacement rod of the metering cylinder in the dispensing direction. The air actuator includes an inlet port for connection to a reservoir of non-solid material being metered and dispensed, an outlet port for connection to a dispenser for dispensing the non-solid material, and a switched port which is connected to the inlet/outlet port in the metering cylinder. The air actuator has a first position wherein the inlet port is connected with the switched port and a second position wherein the outlet port is connected to the switched port

BRIEF DESCRIPTION OF THE DRAWINGS

FIG. 1 is a perspective view of a metering assembly according to the present invention with the assembly connected to compressed air lines and a reservoir and dispensing means;

FIG. 2 is a blow up perspective view of the metering cylinder portion of the metering assembly of FIG. 1;

DETAILED DESCRIPTION OF THE PREFERRED EMBODIMENT

Figure 3:
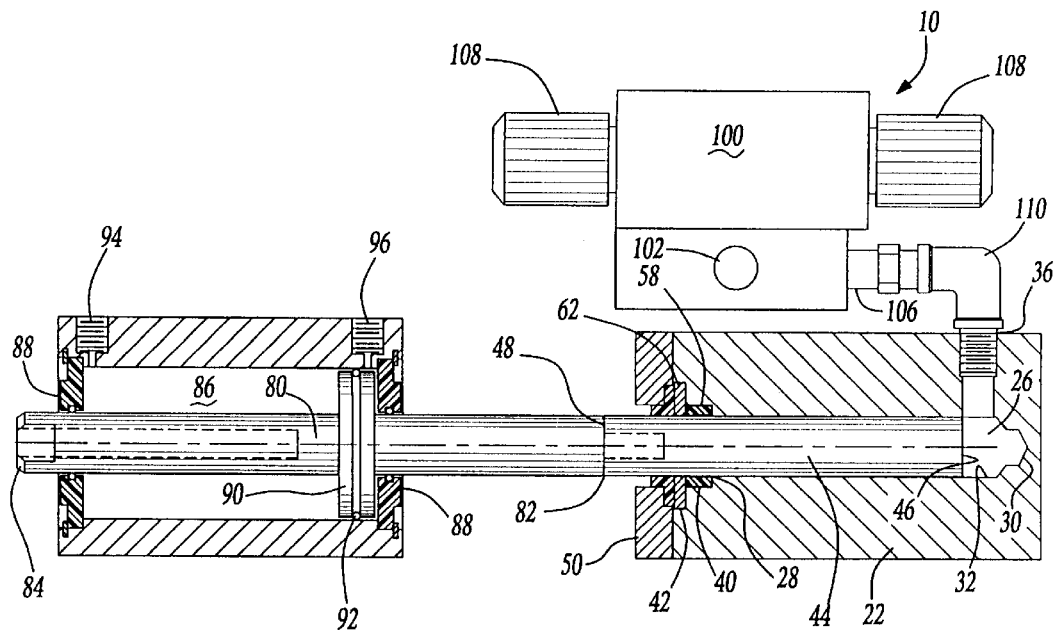
FIG. 3 is a cutaway side view of the metering assembly of FIG. 1 showing the metering cylinder in its nearly empty position.

Referring to FIGS. 1–3, the preferred embodiment of a metering assembly according to the present invention is shown generally at 10. The metering assembly 10 includes a metering cylinder 20, an air cylinder 70, and an air actuator 100. The metering cylinder 20 meters and dispenses a non-solid material. The air actuator controls whether the metering cylinder 20 is in communication with a reservoir of material 12 or with a dispensing means 14. The air cylinder operates to assist the metering cylinder 20 in dispensing material and, in some embodiments, to assist the metering cylinder 20 during the filling stage.

The majority of the metering cylinder 20 consists of a metering body 22 which is formed from a rectangular block of metal. The rectangular block is arranged lengthwise with one of its ends being defined as a front face 24. A cylindrical bore 26 extends inwardly from the front face 24 and has a circular opening 28, a bottom 30, and a cylindrical side surface 32 interconnecting the opening 28 and the bottom 30 of the bore 26. As shown, the bottom 30 of the bore 26 is beveled, which is a shape imparted to the bottom of the bore by the tool used to cut the bore 26. Alternatively, the bottom 30 of the bore 26 may be flat or rounded or some other shape. The diameter and the depth of the bore 26 is chosen based on the application and on the amount of material to be metered and dispensed during one cycle of operation.

The top 34 of the metering body 22 has an inlet/outlet port 36 defined therein. This inlet/outlet port passes 36 from the top 34 of the metering body 22 to the side 32 of the bore 26 adjacent to the bottom 30 of the bore. The inlet/outlet port 36 allows material to flow into and out of the bore 26 during operation of the metering assembly 10. The front face 24 of the metering body 22 has a recess 38 defined therein surrounding the circular opening 28 of the bore 26. This recess 38 consists of a first portion 40 having a diameter larger than the diameter of the bore and a second portion 42 having a yet greater diameter than the firs portion 40. The smaller diameter portion 40 is located adjacent the circular opening 38 of the bore 26 and the larger diameter portion 42 is adjacent the front face 24 of the metering body 22.

Figure 4:
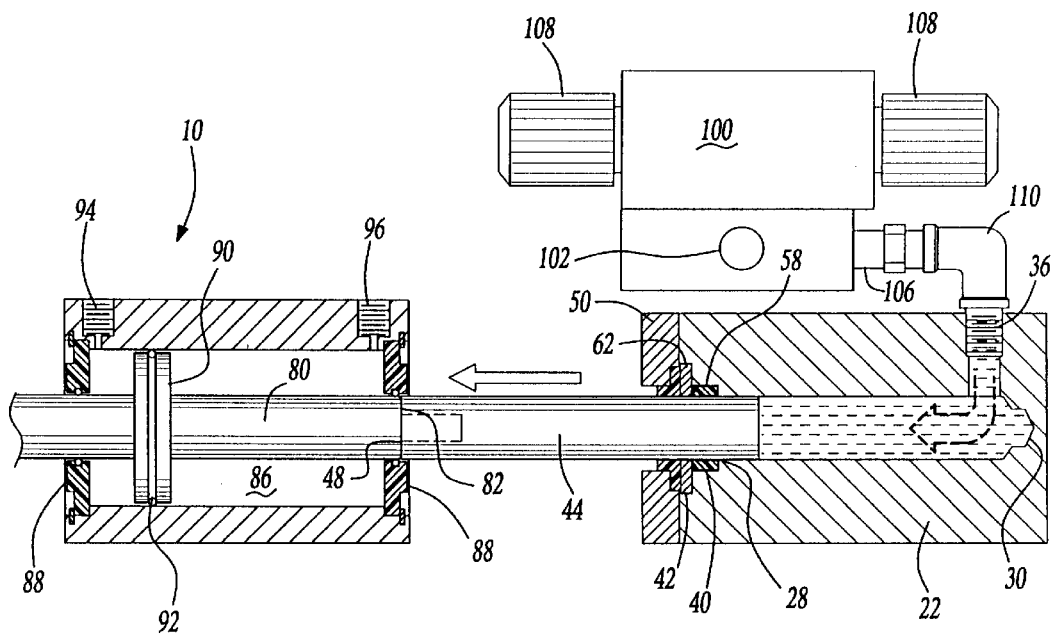
FIG. 4 is a cutaway side view of the metering assembly of FIG. 1 showing the actuator and displacement rods moving in the filling direction.

The metering cylinder 20 also includes a cylindrical displacement rod 44 which has a diameter smaller than the diameter of the cylindrical bore 26 and a length greater than the depth of the bore 26. The rod 44 has a first end 46 which is positioned in the cylindrical bore 26 and an opposed second end 48 which extends outwardly away from the bore 26. The diameter of the displacement rod 44 is just slightly smaller than the diameter of the bore 26 so that the rod 44 fits nearly flush with the bore 26. The rod 44 can be moved back and forth in the bore 26 between a first position where the first end 46 of the rod 44 is adjacent the bottom 30 of the bore 26, as shown in FIG. 3, and a second position wherein the first end 46 of the displacement rod 44 is spaced from the bottom 30 of the bore 26. As shown in FIG. 3, by "adjacent" to the bottom 30 of the bore 26 it is meant that the first end 46 of the displacement rod 44 is near to the bottom of the bore. As illustrated, the first position of the displacement rod 44 may be where the first end 46 is spaced a short distance away from the bottom 30 of the bore 26. Alternatively, the first position of the displacement rod 44 may be where the first end 46 is flush or nearly flush with the bottom 30 of the bore 26. The second position of the displacement rod 44 is shown in FIG. 4 wherein the first end 46 of the displacement rod is spaced from the bottom 30 of the bore 26 by a significant distance. As can be seen, the volume of the bore 30 not occupied by the displacement rod 44 varies dramatically as the rod 44 is moved between the first and second positions. The precise position defined as the second position may vary depending on the application but the first end 46 of the rod 44 will always be further from the bottom 30 of the bore 26 when the rod 44 is in the second position than when it is in the first position.

The metering cylinder 20 also includes an end cover 50 which is formed from square piece of metal and has an opening 52 defined therethrough. One side of the end cover 50 is defined as a mating face 54 and is positioned so that the mating face 54 abuts with the front face 24 of the metering body 22. The opening 52 in the end cover 50 has a diameter greater than the diameter of the displacement rod 44 and is positioned so that the opening 52 is aligned with the cylindrical bore 26 and so the displacement rod 44 passes through the opening 52. The opening 52 in the end cover 50 is stepped having a larger diameter portion 56 adjacent the mating face 54.

For proper functioning of the metering cylinder 20, it is important that the displacement rod 44 be tightly sealed in the bore 26 of the metering body 22. In the preferred embodiment, an annular seal 58 having a circular wiping edge 60 surrounding the rod 44 is positioned in the smaller diameter portion 40 of the recess 38 in the front face 24 of the metering body 22 such that the wiping edge 60 is adjacent the circular opening 28 of the bore 26. As will be clear to one of skill in the art, the seal 58 may be of various designs and of various materials. However, the seal 58 should be capable of withstanding high pressure and be constructed of a material designed for exposure to the material the metering cylinder 20 will be metering and dispensing. A circular retainer 62 is positioned in the larger diameter portion 42 of the recess 38 in the front face 24 of the metering body 22 and acts to maintain the seal 58 in position adjacent the circular opening 28 of the bore 26. The retainer 62 is shaped like a washer, with a central opening 64 larger than the diameter of the displacement rod 44.

In the preferred embodiment, an annular wiper 66 is positioned in the opening 52 in the end cover 50 so that it surrounds the displacement rod 44. The wiper 66 is designed to prevent contamination from reaching the annular seal 58 inside the metering body 22. As shown, the wiper 66 has a smaller diameter portion 67 and larger diameter portion 68 and is positioned such that its larger diameter portion 68 is located in the larger diameter portion 56 of the end cover opening 52 such that its smaller diameter portion 67 extends away from the mating face 54 of the end cover 50. In this way, the wiper 66 is trapped between the end cover 50 and the remainder of the metering cylinder 50. As shown, the retainer 62, positioned in the recess 38 in the front face 24 of the metering body 22, is positioned between the wiper 66 and the seal 58 and acts to retain the seal 58 in the recess 38 and the wiper 66 in the opening 52. As will be clear to one of skill in the art, the wiper 66 may be of various designs and made of various materials.

The air cylinder portion 70 of the metering assembly 10 is supported in a position spaced from the metering cylinder 20. In the preferred embodiment, the air cylinder 70 is supported in the spaced position by four support members 72 which extend from the four corners of the front face 24 of the metering body 22, through the corners of the end cover 50, and extend outwardly therefrom. The air cylinder 20 consists of an air cylinder body 74 which is shaped as a rectangular block positioned longwise to and aligned with the metering cylinder 20. The support members 72 extend through the four corners of the air cylinder body 74 and terminate in threaded portions 76 on which lock nuts 78 are tightened to retain the air cylinder body 74. The support members 72 solidly position the air cylinder body 74 and the metering body 22 relative to one another and maintain them in alignment.

The air cylinder 70 also includes an air cylinder rod 80 which extends through the air cylinder body 74. The air cylinder rod 80 is a cylindrical metal rod having a similar diameter to the diameter of the displacement rod 44 of the metering cylinder 20. One end of the air cylinder rod 80 is defined as an actuator end 82 and extends from the air cylinder body 74 toward the metering cylinder 20. The actuator end 82 is connected to the second end 48 of the displacement rod 44 of the metering cylinder 20 for movement therewith in both the filling and dispensing directions. The other end of the air cylinder rod 80 is defined as a free end 84 and extends out of the air cylinder body 74 in a direction away from the metering cylinder 20.

As best shown in FIG. 3, the air cylinder body 74 has a cylindrical internal chamber 86 running end to end with the air cylinder rod 80 running through its center. The ends of the chamber 86 are defined by a pair of pneumatic seals 88 through which the air cylinder rod 80 passes. The internal chamber 86 has a diameter significantly larger than the diameter of the air cylinder rod 80. Surrounding and connected to the air cylinder rod 80 is a disk 90 having a diameter nearly as great as the diameter of the chamber. The disk 90 has a circumferential seal 92 which seals it to the sides of the cylindrical chamber 86. The disk 90 divides the internal chamber 86 into two separate airtight sub-chambers. As the disk 90 and the air cylinder rod 80 move back and forth, the relative sizes of the two separated sub-chambers change. The air cylinder body 74 also includes a first port 94 and second port 96 which communicate with the internal chamber 86. The ports 94, 96 are positioned adjacent each of the ends, or seals 88, of the chamber 86 so that one of the ports communicates with the sub-chamber on one side of the disk 90 while the other port communicates with the sub-chamber on the other side of the disk 90. The air cylinder 70 is designed to have compressed air lines connected to the first and second ports 94, 96 for actuation of the air cylinder 70. In operation, if compressed air is supplied to the first port, the pressure in the sub-chamber on the left side of the disk 90 becomes significantly greater than the pressure in the sub-chamber on the right side of the disk 90 thereby urging the disk 90, and the air cylinder rod 80, to move to the right, or in the dispensing direction. If the excess pressure in the sub-chamber on the left side of the disk 90 is then released, returning that sub-chamber to atmospheric pressure, and compressed air is provided to the second port 96, and to the sub-chamber on the right side of the disk 90, the disk 90 is urged toward the left, in the filing direction.

The air actuator portion 100 of the metering assembly 10 may be of several designs. A common characteristic is that the air actuator 100 has an inlet port 102, an outlet port 104, and a switched port 106 and is capable of connecting either the inlet port 102 or the outlet port 104 to the switched port 106. The air actuator 100 has a pair of signal ports 108 each connected to a compressed air signal line. The air actuator 100 responds to a compressed air signal at one of the signal ports 108 by moving internal valve parts so as to change whether the inlet port 102 or the outlet port 104 is connected to the switched port 106. Other types of valves may be substituted for the illustrated air actuator 100 such as an electrically operating switching valve.

The air actuator 100 is positioned adjacent the metering cylinder 20 with a pipe 110 interconnecting the switched port 106 and the inlet/outlet port 36 on the metering cylinder 20. For ease of description, the air actuator 100 is described as having a first position and a second position. When the air actuator 100 is in its first position, the inlet port 102 is connected with the switched port 106 and when the air actuator 100 is in the second position the outlet port 104 is connected with the switched port 106.

Figure 5:
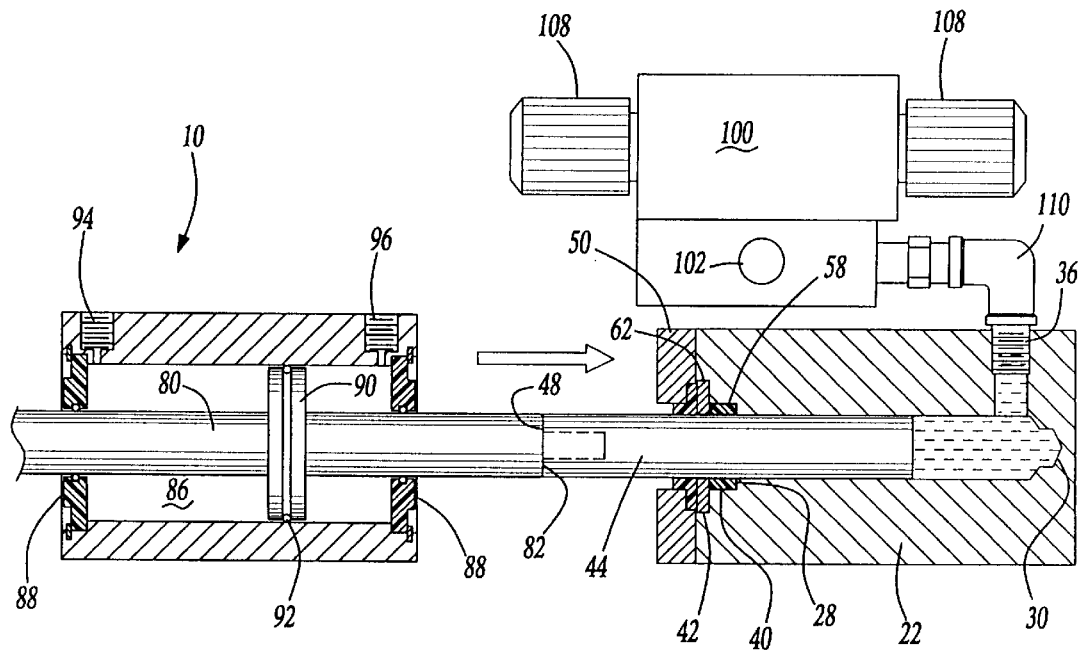
FIG. 5 is a cutaway side view of the metering assembly of FIG. 1 showing the actuator and displacement rods moving in the dispensing direction.

Referring now to FIGS. 1 and 3–5, the operation of the metering assembly 10 will be described. As shown in FIG. 1, the metering assembly 10 is connected to a variety of peripheral equipment. A reservoir 12 of non-solid material is connected to the inlet port 102 of the air actuator 100. The reservoir 12 supplies non-solid material, under pressure, to the inlet port 102. The outlet port 104 of the air actuator 100 is connected to a dispensing means 14 such as a robotic sealant dispenser used in an assembly operation. The connections between the reservoir 12, the air actuator 100, and the dispensing means 74 are typically by means of high pressure pipe or tubing. Switched compressed air lines 16 are connected to the first and second ports 94, 96 on the air cylinder 70 and compressed air signal lines 18 are connected to the signal ports 108 of the air actuator 100. Starting the description with the displacement rod 44 of the metering assembly 10 positioned in its first position, as shown in FIG. 3, the air actuator 100 is placed in its first position. This allows non-solid material from the reservoir 12, supplied under pressure, to flow through the inlet port 102, out the switched port 106, through the interconnecting pipe 110, through the inlet/outlet port 36, and into the metering body 22 to occupy the portion of the bore 26 not occupied by the displacement rod 44. As the non-solid material flows into the bore 26, the displacement rod 44 is forced in the filling direction. This movement will cause the air cylinder rod 80 of the air cylinder 70 to also move in the filling direction until the displacement rod 44 reaches its second position. The second position will typically correspond to the position where the disk 90 inside the chamber 86 of the air cylinder body 74 reaches the leftmost end cif the chamber 86. At this point, the disk 90 will contact one end of the chamber, preventing further movement of the air cylinder rod 80 and the displacement rod 44. Once the displacement rod 44 reaches its second position, the signal lines 18 cause the air actuator 100 to switch to its second position, thereby connecting the switched port 106 with the outlet port 104. Compressed air is then provided to the first port 94 of the air cylinder 70. This causes the disk 90 and the air cylinder rod 80 to move in the dispensing direction thereby causing the displacement rod 44 to also move in the dispensing direction as shown in FIG. 5. As the displacement rod 44 moves in the dispensing direction, the non-solid material occupying the bore 26 is forced out through the inlet/outlet port 36, through the interconnecting pipe 110, through the switched port 106, out through the outlet port 104, and to the dispensing means 14. The process continues until the disk 90 inside the air cylinder body 74 reaches the limit of its travel, at which point the disk 90 contacts the rightmost end of the chamber 86. The process is then repeated by switching the air actuator 100 back to its first position and refilling the bore 26 of the metering cylinder 20. Because the displacement rod 44 has a limited amount of travel, and the bore 26 is of a fixed size, each cycle of the metering assembly 10 dispenses the same, controlled amount of non-solid material.

The above-described operation assumes that the air cylinder 70 does not assist the movement of the displacement rod 44 during the filling process. In the above-described process, a compressed air line is not necessary for the second port 96. In applications such as these, a small filter may be installed in the second port 96 to allow air to flow in and out while preventing contaminants from reaching the internal chamber 86. Alternatively, some applications may require that the air cylinder 70 assist in moving the displacement rod 44 during the filling process. In these situations, compressed air is provided to the second port 96 during the filling process as the displacement rod 44 moves from the first position to the second position.

Figure 6:
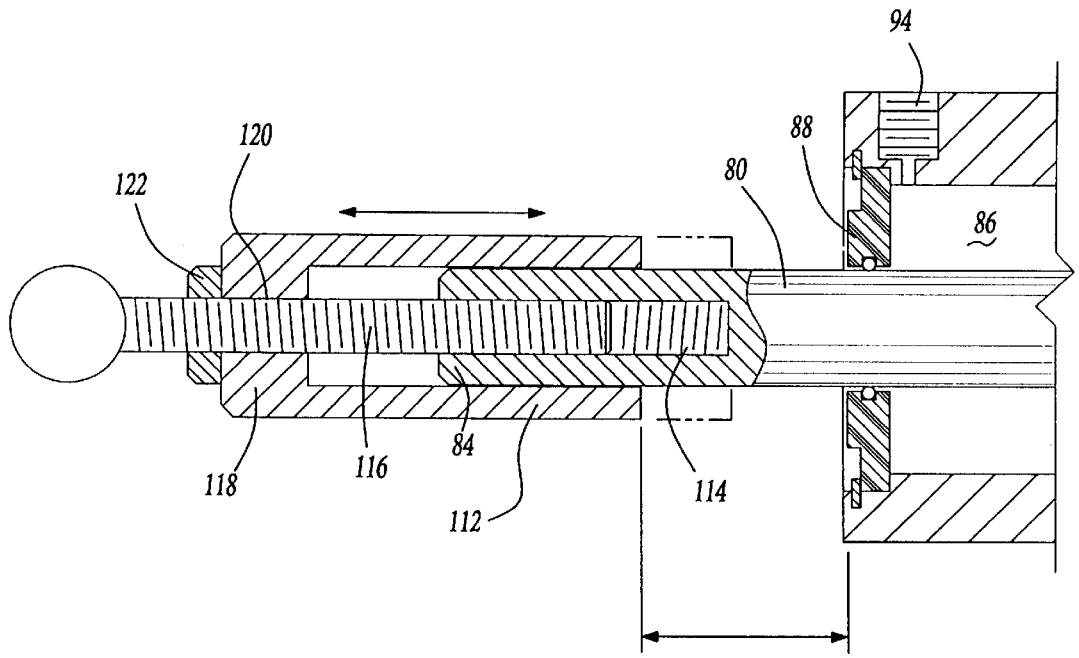
FIG. 6 is a cutaway side view of a preferred embodiment of a displacement rod travel limiter.

Referring now to FIG. 1 and FIG. 6, a further element of the present invention is illustrated. As mentioned in the background, it is often desirable or necessary to adjust the amount of material dispensed by a metering assembly due to changes in a process. In these applications, the metering assembly of the present invention is provided with a displacement rod travel limiting means. In the preferred embodiment, the travel limiting means comprises a sleeve 112 positioned around a portion of the air cylinder rod 70 between the free end 84 of the air cylinder rod 80 and the air cylinder body 74. As best illustrated in FIG. 6, the free end 84 of the air cylinder rod 80 has a threaded bore 114 defined therein. A threaded shaft 116 adjustably engages the threaded bore 114 and extends outwardly away from the free end 84 of the air cylinder rod 80. The sleeve 112 has an engagement portion 118 with a threaded hole 120 defined therethrough. The threaded rod 116 passes through the threaded hole 120 in engagement portion 118 of the sleeve 112 so that the sleeve 112 may be adjustably positioned on the threaded rod 116. A lock nut 122 is positioned on the threaded rod 116 adjacent to the threaded hole 120 in engagement portion 118 of the sleeve 112 and is used to lock the sleeve 112 to the threaded rod 116. In operation, the position of the sleeve 112 is adjusted relative to the free end 84 of the air cylinder rod 80. By positioning the sleeve 112 so that it covers a larger portion of the air cylinder rod 80, the travel of the air cylinder rod 80, and therefore the displacement rod 44 is limited. As the air cylinder rod 80 moves in the dispensing direction, the sleeve 112 contacts the leftmost seal 88 which defines the end of the air cylinder body 74. When the sleeve 112 contacts the seal 88, the air cylinder rod 80 is prevented from traveling further in the dispensing direction. This prevents the displacement rod 44 from fully bottoming in the bore 26 thereby reducing the amount of non-solid material dispensed by the metering cylinder 20. In this way, the amount of material dispensed by the metering cylinder 20 can be adjusted or fine tuned. As will be clear to one of skill in the art, the sleeve 112 could be positioned on the free end 84 of the air cylinder rod 80 in a variety of ways thereby achieving the same objective. A threaded sleeve may be positioned around the displacement rod 80 adjacent the actuator end 82 thereby limiting the travel of the air cylinder rod 80 in the filling direction. This also serves to limit the amount of material dispensed by the metering cylinder 20 since the displacement rod 44 is prevented from traveling as far as it would without the sleeve. An adjustable sleeve may be positioned on one, both, or neither of the ends of the air cylinder rod 80 depending upon the application of the metering assembly 10.

In view of the teaching presented herein, other modifications and variations of the present inventions will be readily inherent to those of skill in the art. The foregoing drawings, discussion, and description are illustrated of some embodiments of the present invention, but are not meant to be limitations on the practice thereof. It is the following claims, including all equivalents, which define the scope of the invention.

I claim:

1. A metering assembly for metering and dispensing non-solid material, said assembly comprising:
    a metering cylinder comprising;
    a metering body with a bore defined therein and an inlet/outlet port defined therein, said bore having a bottom and said port in communication with said bore;
    a displacement rod having a first end positioned in said bore and an opposed second end, said displacement rod having a first position wherein said first end is adjacent said bottom of said bore and a second position wherein said first end is spaced from said bottom of said bore, said displacement rod capable of movement between said first and said second positions, movement from said first position to said second position defined as movement in a filling direction and movement from said second position to said first position defined as movement in a dispensing direction; and
    a sealing means for sealing said rod to said bore;
    an air cylinder supported in a position spaced from said metering cylinder, said air cylinder comprising an air cylinder body; and
    an air cylinder rod extending from said air cylinder body toward said metering cylinder, said air cylinder rod having an actuator end connected to said second end of said displacement rod for movement therewith in said filling and dispensing directions;
    said air cylinder operable to move said air cylinder rod such that said actuator end moves in said dispensing direction urging said displacement rod in said dispensing direction; and
    an air actuator comprising;
    an inlet port for communication with a reservoir of non-solid material to be metered and dispensed;
    an outlet port for communication with a dispensing means for dispensing non-solid material; and
    a switched port in communication with said inlet/outlet port in said metering body;
    said air actuator having a first position wherein said inlet port is in communication with said switched port, and a second position wherein said outlet port is in communication with said switched port.

2. The metering assembly of claim 1, further comprising a displacement rod travel limiting means for limiting the movement of the displacement rod.

3. The metering assembly of claim 2, wherein said displacement rod travel limiting means comprises a sleeve positioned around and supported on said air cylinder rod between said actuator end and said air cylinder body so that said sleeve contacts said air cylinder body as said air cylinder rod moves in said filling direction thereby preventing said displacement rod from reaching said second position.

4. The metering assembly of claim 3, wherein said sleeve is supported on said air cylinder rod by a threaded engagement between said sleeve and said air cylinder rod.

5. The metering assembly of claim 1, wherein said air cylinder rod extends through said air cylinder body and has a free end extending away from said metering cylinder.

6. The metering assembly of claim 5, further comprising a displacement rod travel limiting means, said travel limiting means comprising a sleeve positioned around a portion of said air cylinder rod between said free end and said air cylinder body so that said sleeve contacts said air cylinder body as said air cylinder rod moves in said dispensing direction thereby preventing said displacement rod from reaching said first position.

7. The metering assembly of claim 6, wherein said sleeve is supported on said air cylinder rod by a threaded engagement between said sleeve and said air cylinder rod.

8. The metering assembly of claim 1, wherein said metering cylinder has a front face with said bore extending inwardly therefrom and said metering cylinder further includes an end cover having an opening defined there through, said end cover supported on said metering body and having a mating face abutting said front face of said metering body with said opening aligned with said bore.

9. The metering assembly of claim 8, wherein said front face of said metering body has a recess defined therein surrounding said bore and said sealing means comprises a seal positioned in said recess.

10. The metering assembly of claim 8, wherein said metering cylinder further comprises a wiper positioned in said opening in said end cover and surrounding said displacement rod.

11. The metering assembly of claim 1, wherein said bore is cylindrical and said displacement rod is cylindrical.

12. The metering assembly of claim 1, wherein said air cylinder is operable to move said air cylinder rod such that said actuator end moves in said filling direction thereby urging said displacement rod in said filling direction.

13. A metering cylinder for metering and dispensing non-solid material, said metering cylinder comprising:
    a metering body having a front face with a cylindrical bore extending inwardly therefrom, said cylindrical bore having a circular opening, a bottom, and a cylindrical side surface interconnecting said opening and said bottom, said cylindrical bore having a diameter and a depth associated therewith, said metering body further having an inlet/outlet port defined therein, said port in communication with said cylindrical bore, said front face further having a recess defined therein surrounding said circular opening;
    a cylindrical displacement rod having a diameter smaller than the diameter of said cylindrical bore and a length greater than the depth of sa d cylindrical bore, said rod having a first end positioned in said cylindrical bore and an opposed second end, said rod having a first position wherein said first end is adjacent said bottom of said cylindrical bore and a second position wherein said first end is spaced from said bottom of said cylindrical bore, said displacement rod capable of movement between said first and said second positions;

an end cover having a mating face for abutting with said front face of said metering body, said end cover having an opening defined therethrough, said opening having a diameter greater than the diameter of said cylindrical displacement rod, said end cover being supported on said metering body such that said mating face is adjacent said front face and said opening in said end cover is aligned with said cylindrical bore;

an annular seal having a circular wiping edge surrounding said rod, said seal positioned in said recess in said front face of said metering body such that said wiping edge is adjacent said circular opening of said cylindrical bore;

an annular wiper surrounding said rod and positioned in said opening in said end cover; and a retainer for retaining said seal in said recess and said wiper in said opening.

14. A method for metering and dispensing non-solid material comprising the steps of:

a. Providing a metering assembly comprising:
  a metering cylinder comprising;
  a metering body with a bore defined therein and an inlet/outlet port defined therein, said bore having a bottom and said port in communication with said bore;
  a displacement rod having a a first end positioned in said bore and an opposed second end, said displacement rod having a first position wherein said first end is adjacent said bottom of said bore and a second position wherein said first end is spaced from said bottom of said bore, said
  displacement rod capable of movement between said first and said second positions, movement from said first position to said second position defined as movement in a filling direction and movement from said second position to said first position defined as movement in a dispensing direction; and
  a sealing means for sealing said rod to said bore;
  an air cylinder supported in a position spaced from said metering cylinder, said air cylinder comprising
  an air cylinder body; and
  an air cylinder rod extending from said air cylinder body toward said metering cylinder, said air cylinder rod having an actuator end connected to said second end of said displacement rod for movement therewith in said filling and dispensing directions;
  said air cylinder operable to move said air cylinder rod such that said actuator end moves in said dispensing direction urging said displacement rod in said dispensing direction; and
  an air actuator comprising;
  an inlet port for communication with a reservoir of non-solid material to be metered and dispensed;
  an outlet port for communication with a dispensing means for dispensing non-solid material; and
  a switched port in communication with said inlet/outlet port in said metering body;
  said air actuator having a first position wherein said inlet port is in communication with said switched port, and a second position wherein said outlet port is in communication with said switched port;

b. Providing a reservoir of pressurized non-solid material to be metered and dispensed;

c. Providing a dispenser for dispensing the non-solid material;

d. Connecting said reservoir to said inlet port on said metering assembly so that pressurized non-solid material is provided to said inlet port;

e. Connecting said dispenser to said outlet port on said metering assembly;

f. Starting with said displacement rod in said first position, placing said air actuator in its first position;

g. Allowing non-solid material to flow into the bore thereby causing said displacement rod to move in said filling direction until said displacement rod reaches said second position;

h. Placing said air actuator in its second position;

i. Actuating said air cylinder to move said air cylinder rod in said dispensing direction thereby urging said dispensing rod in said dispensing direction, thereby forcing non-solid material from said bore through said inlet/outlet port and through said outlet port to said dispenser so that non-solid material is dispensed from said dispenser.

* * * * *

UNITED STATES PATENT AND TRADEMARK OFFICE
CERTIFICATE OF CORRECTION

PATENT NO. : 6,079,596
DATED : June 27, 2000
INVENTOR(S) : Jerry Dedoes

Page 1 of 1

It is certified that error appears in the above-identified patent and that said Letters Patent is hereby corrected as shown below:

Column 2,
Line 62 - Replace "firs" with --first--

Column 3,
Line 32 - Before "square" insert --a--

Column 4,
Line 6 - Replace "50" with --20--
Line 20 - Replace "20" with --70--

Column 5,
Line 8 - Replace "filing" with --filling--
Line 61 - Replace "cif" with --of--

Column 6,
Line 40 - Replace "70" with --80--

Column 8,
Line 60 - Replace "sa d" with --said--

Signed and Sealed this

Third Day of July, 2001

*Attest:*

NICHOLAS P. GODICI
*Attesting Officer*    *Acting Director of the United States Patent and Trademark Office*